US008564603B2

(12) United States Patent
Chiu et al.

(10) Patent No.: US 8,564,603 B2
(45) Date of Patent: Oct. 22, 2013

(54) APPARATUS FOR CONTROLLING MEMORY DEVICE AND RELATED METHOD

(75) Inventors: Chun-Yu Chiu, Tainan County (TW); Tsung-Han Yang, Tainan County (TW)

(73) Assignee: Himax Technologies Limited, Fonghua Village, Xinshi Dist., Tainan (TW)

( * ) Notice: Subject to any disclaimer, the term of this patent is extended or adjusted under 35 U.S.C. 154(b) by 265 days.

(21) Appl. No.: 12/910,859

(22) Filed: Oct. 24, 2010

(65) Prior Publication Data

US 2012/0098843 A1 Apr. 26, 2012

(51) Int. Cl.
*G06F 13/00* (2006.01)

(52) U.S. Cl.
USPC .......................................... 345/536; 345/531

(58) Field of Classification Search
USPC .......................................... 345/536
See application file for complete search history.

(56) References Cited

U.S. PATENT DOCUMENTS

| | | | | | |
|---|---|---|---|---|---|
| 4,620,186 | A * | 10/1986 | Krause et al. | 345/22 |
| 5,161,221 | A * | 11/1992 | Van Nostrand | 711/157 |
| 5,561,777 | A * | 10/1996 | Kao et al. | 711/5 |
| 5,587,726 | A * | 12/1996 | Moffat | 345/539 |
| 5,765,182 | A * | 6/1998 | Lau et al. | 711/5 |
| 5,815,169 | A * | 9/1998 | Oda | 345/544 |
| 6,000,019 | A * | 12/1999 | Dykstal et al. | 711/157 |
| 6,215,721 | B1 * | 4/2001 | Kim | 365/230.03 |
| 6,496,192 | B1 * | 12/2002 | Shreesha et al. | 345/540 |
| 7,046,249 | B2 * | 5/2006 | Champion | 345/531 |
| 7,230,627 | B2 * | 6/2007 | Freker et al. | 345/540 |
| 7,557,811 | B2 * | 7/2009 | Linzer et al. | 345/531 |
| 7,573,483 | B2 * | 8/2009 | Champion | 345/531 |
| 7,996,601 | B2 * | 8/2011 | Yang et al. | 711/105 |
| 2002/0109692 | A1 * | 8/2002 | Champion | 345/536 |
| 2002/0109693 | A1 * | 8/2002 | Champion et al. | 345/536 |
| 2003/0184561 | A1 * | 10/2003 | Vorst | 345/619 |
| 2004/0264278 | A1 * | 12/2004 | Ahn et al. | 365/230.03 |
| 2005/0057572 | A1 * | 3/2005 | Champion et al. | 345/540 |
| 2007/0188508 | A1 * | 8/2007 | Freker et al. | 345/540 |
| 2008/0100635 | A1 * | 5/2008 | Wise et al. | 345/536 |
| 2008/0297525 | A1 * | 12/2008 | Rai | 345/534 |
| 2010/0283789 | A1 * | 11/2010 | Lai et al. | 345/502 |
| 2011/0273462 | A1 * | 11/2011 | Yang et al. | 345/536 |
| 2012/0089802 | A1 * | 4/2012 | Zohar et al. | 711/170 |

* cited by examiner

*Primary Examiner* — Ryan R Yang
*Assistant Examiner* — Jin Ge
(74) *Attorney, Agent, or Firm* — Winston Hsu; Scott Margo

(57) ABSTRACT

A method for controlling a memory device includes: categorizing a plurality of sub-memory units of the memory device into a first group of sub-memory units and a second group of sub-memory units; sequentially storing pixel data of a plurality of pixels being displayed on a first line of a display screen into the sub-memory units of the first group of sub-memory units; sequentially storing the pixel data of a plurality of pixels being displayed on a second line next to the first line of the display screen into the sub-memory units of the second group of sub-memory units; and, starting from a next but one sub-memory unit to the first selected sub-memory unit, sequentially storing the pixel data of a plurality of pixels being displayed on a third line next to the second line of the display screen into the sub-memory units of the first group of sub-memory units.

18 Claims, 5 Drawing Sheets

APPARATUS FOR CONTROLLING MEMORY DEVICE AND RELATED METHOD

BACKGROUND OF THE INVENTION

1. Field of the Invention

The present invention relates to an apparatus for controlling a memory device and a related method, and more particularly, to a memory controlling system for writing pixel data of pixels in a display screen into a memory device and a method thereof.

2. Description of the Prior Art

An interlacing method is always used in a memory controlling system to increase the accessing rate of a memory block. Conventionally, in an interlace system, the memory block is divided into a predetermined number of sub-memory units, and a memory controller sequentially stores the pixel data of pixels in a panel to the predetermined number of sub-memory units to increase the performance. In some applications, however, such as a mobile phone memory controller, the storing vector of the panel may not be limited to one direction, i.e., the memory controller may store the pixel data of pixels in the panel in various directions, such as from left to right, right to left, top to bottom, bottom to top, etc. Therefore, a shortcoming may emerge in the conventional interlace system when the storing procedure reaches the end of a line and the pixel data of a next line is going to be stored to the sub-memory units. More specifically, the pixel data of the first pixel in a next line may be stored into the same sub-memory unit as the pixel data of the last pixel in the previous line. When this happens, the performance will decrease.

A similar problem will occur when an active window is set to the panel. More specifically, when the pixel data of the last pixel in the active window is stored to one sub-memory unit and the pixel data of the first pixel in the active window is the next pixel data being stored to the sub-memory units, the pixel data of the first pixel in the active window may be stored to the same sub-memory unit of the pixel data of the last pixel in the active window. When this happens, the performance of storing the pixel data in the active window into the memory block will be decreased. Therefore, providing an efficient way for interlacing the memory block to solve the above-mentioned problems is a significant concern in the memory controller field.

SUMMARY OF THE INVENTION

One of the objectives of the present invention is to provide a memory controlling system for writing pixel data of pixels in a display screen into a memory device and a method thereof.

According to an embodiment of the present invention, a method for controlling a memory device is disclosed. The method comprises the steps of: categorizing a plurality of sub-memory units of the memory device into a first group of sub-memory units and a second group of sub-memory units, wherein the first group of sub-memory units is different from the second group of sub-memory units; starting from a first selected sub-memory unit in the first group of sub-memory units, sequentially storing pixel data of a plurality of pixels being displayed on a first line of a display screen into the sub-memory units of the first group of sub-memory units until all the pixel data of the plurality of pixels being displayed on the first line are stored into the sub-memory units of the first group of sub-memory units; starting from a second selected sub-memory unit in the second group of sub-memory units, sequentially storing the pixel data of a plurality of pixels being displayed on a second line next to the first line of the display screen into the sub-memory units of the second group of sub-memory units until all the pixel data of the plurality of pixels being displayed on the second line are stored into the sub-memory units of the second group of sub-memory units; and starting from a next but one sub-memory unit to the first selected sub-memory unit in the first group of sub-memory units, sequentially storing the pixel data of a plurality of pixels being displayed on a third line next to the second line of the display screen into the sub-memory units of the first group of sub-memory units until all the pixel data of the plurality of pixels being displayed on the third line are stored into the sub-memory units of the first group of sub-memory units.

According to a second embodiment of the present invention, an apparatus for controlling a memory device is disclosed, wherein the memory device comprises a plurality of sub-memory units. The apparatus comprises a plurality of first connecting circuit, a plurality of second connecting circuit, and a memory controller. The plurality of first connecting circuits are coupled to a first group of sub-memory units of the memory device. The plurality of second connecting circuit are coupled to a second group of sub-memory units of the memory device, wherein the plurality of sub-memory units are categorized into the first group of sub-memory units and the second group of sub-memory units, and the first group of sub-memory units is different from the second group of sub-memory units. The memory controller is coupled to the first connecting circuit and the second connecting circuit, for, starting from a first selected sub-memory unit in the first group of sub-memory units, sequentially storing pixel data of a plurality of pixels being displayed on a first line of a display screen into the sub-memory units of the first group of sub-memory units via the plurality of first connecting circuits until all the pixel data of the plurality of pixels being displayed on the first line are stored into the sub-memory units of the first group of sub-memory units, for, starting from a second selected sub-memory unit in the second group of sub-memory units, sequentially storing the pixel data of a plurality of pixels being displayed on a second line next to the first line of the display screen into the sub-memory units of the second group of sub-memory units via the plurality of second connecting circuits until all the pixel data of the plurality of pixels being displayed on the second line are stored into the sub-memory units of the second group of sub-memory units, and for, starting from a next but one sub-memory unit to the first selected sub-memory unit in the first group of sub-memory units, sequentially storing the pixel data of a plurality of pixels being displayed on a third line next to the second line of the display screen into the sub-memory units of the first group of sub-memory units via the plurality of first connecting circuits until all the pixel data of the plurality of pixels being displayed on the third line are stored into the sub-memory units of the first group of sub-memory units.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
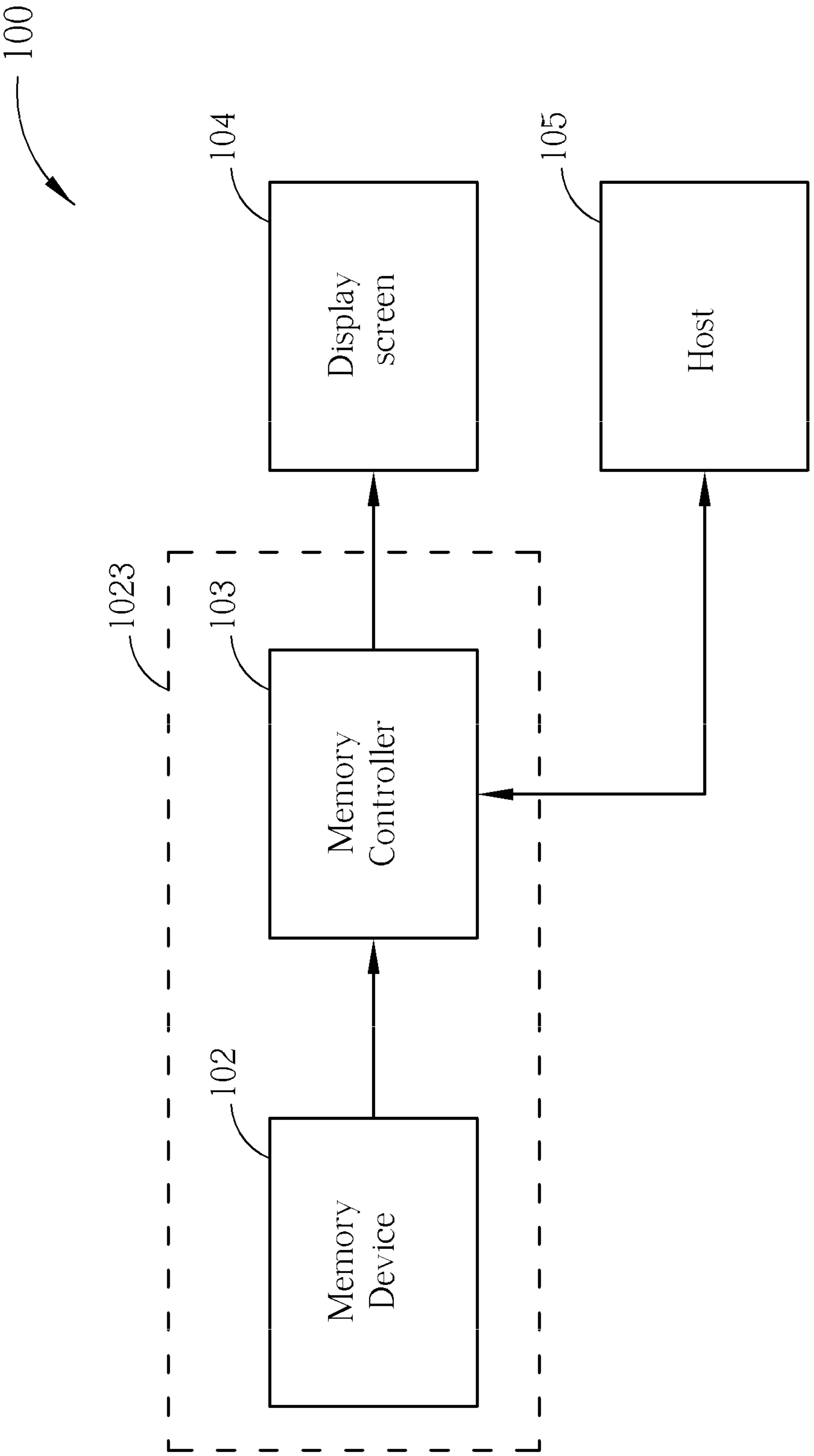
FIG. 1 is a diagram illustrating a memory controlling system of a memory device in a mobile apparatus according to an embodiment of the present invention.
Figure 2:
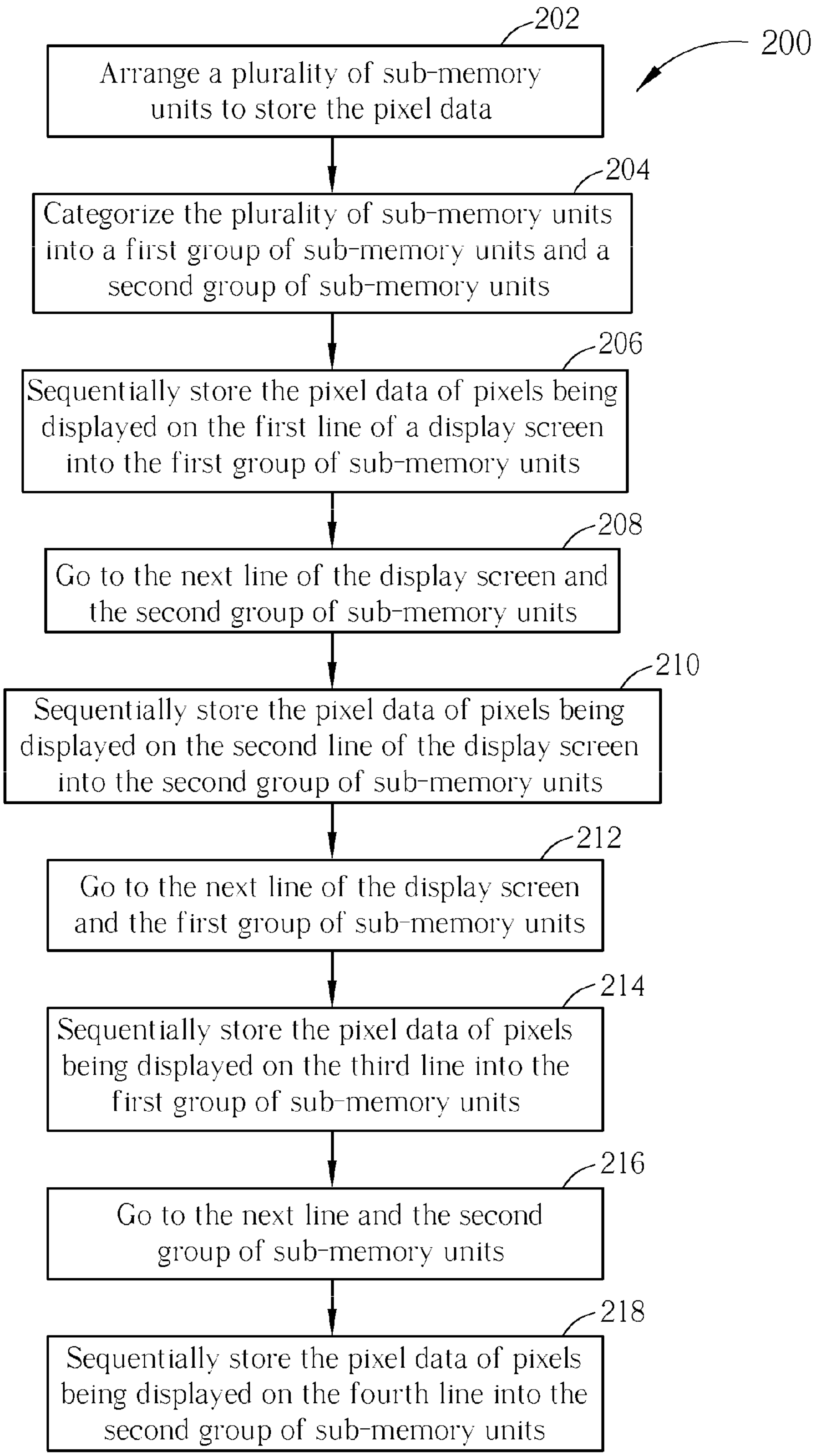
FIG. 2 is a flowchart illustrating a method of writing pixel data of pixels from a display screen into the memory device according to an embodiment of the present invention.

Please refer to FIG. 1. FIG. 1 is a diagram illustrating a memory controlling system 100 of a memory device 102 in a mobile apparatus according to an embodiment of the present invention. The mobile apparatus further comprises a memory controller 103, a display screen (e.g. a panel) 104, and a host 105, wherein the memory device 102 and the memory controller 103 are configured as a driver IC (Integrated circuit) 1023 of the display screen 104, the host 105 inputs the pixel data being displayed on the display screen 104 into the memory device 102 via the memory controller 103, and the display screen 104 is utilized for displaying images of the mobile apparatus. The display screen 104 comprises a plurality of pixels, wherein each pixel corresponds to a pixel data. When the host 105 writes the pixel data being displayed in the display screen 104 into the memory device 102, the memory controller 103 outputs the pixel data of each pixel stored in the memory device 102 to the display screen 104. To increase the operating speed of the mobile apparatus, the present invention is to therefore disclose a method 200 of writing the pixel data of pixels from the host 105 into the memory device 102 for increasing the memory access rate of the memory device 102 as shown in FIG. 2. FIG. 2 is a flowchart illustrating the method 200 according to an embodiment of the present invention. The memory device 102 is divided into a plurality of sub-memory units 1022 according to the present invention. Please note that the memory device 102 has an original memory access rate X before being divided into the plurality of sub-memory units 1022. After the memory device 102 is divided into the plurality of sub-memory units 1022, the memory device 102 has a target memory access rate Y which is a multiple of the original memory access rate X by an integer factor P, and the number M of the plurality of sub-memory units 1022 of the memory device 102 is a multiple of the integer factor P by another integer factor Q which is not less than two, e.g., Q=2. In other words, Y=X*P, and M=Q*P. Provided that substantially the same result is achieved, the steps of the flowchart shown in FIG. 2 need not be in the exact order shown and need not be contiguous; that is, other steps can be intermediate. The method 200 comprises the following steps:

Step 202: Arrange the plurality of sub-memory units 1022 divided from the memory device 102 to store the pixel data being displayed on the display screen 104 according to the equation (1): Y=X*P, and the equation (2): M=Q*P, and Y is the target memory access rate Y of the memory device 102 after divided into the plurality of sub-memory units 1022, X is the original memory access rate of the memory device 102 before divided into the plurality of sub-memory units 1022, P is an integer factor, M is the number of the plurality of sub-memory units 1022, and Q is another integer factor Q not less than two;

Step 204: Categorize the plurality of sub-memory units 1022 of the memory device 102 into a first group of sub-memory units **1022*a* and a second group of sub-memory units 1022*b*, wherein the first group of sub-memory units 1022*a* is different from the second group of sub-memory units 1022*b* (For brevity, the plurality sub-memory units in the first group of sub-memory units 1022*a* are labeled as 1022_1, 1022_3, 1022_5, . . . , 1022_(M−1) and the plurality sub-memory units in the second group of sub-memory units 1022*b* are labeled as 1022_2, 1022_4, 1022_6, . . . , 1022_**M);

Step 206: Starting from one of the sub-memory units, e.g., the sub-memory unit 1022_A, in the first group of sub-memory units **1022*a*, sequentially store the pixel data of pixels being displayed on the current line, i.e., the first line, of the display screen 104 into the sub-memory units 1022_A, 1022_(A+2), 1022_(A+4), . . . , 1022_(M−1), 1022_1, 1022_3, . . . , 1022_(A−2) of the first group of sub-memory units 1022*a*, and after storing a pixel data of a pixel into the sub-memory unit 1022_(A−2), go to the sub-memory unit 1022_A to repeatedly store the pixel data of pixels into the sub-memory units 1022_A, 1022_(A+2), 1022_(A+4), . . . , 1022_(M−1), 1022_1, 1022_3, . . . , 1022_(A−2) until all the pixel data of pixels being displayed on the first line of the display screen 104 are stored into the sub-memory units 1022_A, 1022_(A+2), 1022_(A+4), . . . , 1022_(M−1), 1022_1, 1022_3, . . . , 1022_(A−2) of the first group of sub-memory units 1022*a***;

Step 208: When the pixel data of pixels being displayed on the first line of the display screen 104 are all sequentially stored into the sub-memory units 1022_1, 1022_3, 1022_5, . . . , 1022_(M−1) of the first group of sub-memory units **1022*a*, go to the next line, i.e., the second line, of the display screen 104 and the second group of sub-memory units 1022*b***;

Step 210: Starting from one of the sub-memory units, e.g., the sub-memory unit 1022_B, in the second group of sub-memory units **1022*b*, sequentially store the pixel data of pixels being displayed on the second line of the display screen 104 into the sub-memory units 1022_B, 1022_(B+2), 1022_(B+4), . . . , 1022_M, 1022_2, 1022_4, . . . , 1022_(B−2) of the second group of sub-memory units 1022*b*, and after storing a pixel data of a pixel into the sub-memory unit 1022_(B−2), go to the sub-memory unit 1022_B to repeatedly store the pixel data of pixels into the sub-memory units 1022_B, 1022_(B+2), 1022_(B+4), . . . , 1022_M, 1022_2, 1022_4, . . . , 1022_(B−2) until all the pixel data of pixels being displayed on the second line of the display screen 104 are stored into the sub-memory units 1022_B, 1022_(B+2), 1022_(B+4), . . . , 1022_M, 1022_2, 1022_4, . . . , 1022_(B−2) of the second group of sub-memory units 1022*b***;

Step 212: When the pixel data of pixels being displayed on the second line of the display screen 104 are all sequentially stored into the sub-memory units 1022_2, 1022_4, 1022_

6, . . . , 1022_M of the second group of sub-memory units 1022*b*, go to the next line, i.e., the third line, of the display screen 104 and the first group of sub-memory units 1022*a;*

Step 214: Starting from the next but one sub-memory unit to the sub-memory unit 1022_A, i.e., the sub-memory unit 1022_(A+2) or the sub-memory unit 1022_(A−2) (In this embodiment, the next but one sub-memory unit to the sub-memory unit 1022_A is chosen as the sub-memory unit 1022_(A+2) for brevity), in the first group of sub-memory units 1022*a*, sequentially store the pixel data of pixels being displayed on the third line of the display screen 104 into the sub-memory units 1022_(A+2), 1022_(A+4), 1022_(A+6), . . . , 1022_(M−1), 1022_1, 1022_3, . . . , 1022_(A−2), 1022_A of the first group of sub-memory units 1022*a*, and after storing a pixel data of a pixel into the sub-memory unit 1022_A, go to the sub-memory unit 1022_(A+2) to repeatedly store the pixel data of pixels into the sub-memory units 1022_(A+2), 1022_(A+4), 1022_(A+6), . . . , 1022_(M−1), 1022_1, 1022_3, . . . , 1022_(A−2), 1022_A until all the pixel data of pixels being displayed on the third line of the display screen 104 are stored into the sub-memory units 1022_(A+2), 1022_(A+4), 1022_(A+6), . . . , 1022_(M−1), 1022_1, 1022_3, . . . , 1022_(A−2), 1022_A of the first group of sub-memory units 1022*a;*

Step 216: When the pixel data of pixels being displayed on the third line of the display screen 104 are all sequentially stored into the sub-memory units 1022_1, 1022_3, 1022_5, . . . , 1022_(M−1) of the first group of sub-memory units 1022*a*, go to the next line, i.e., the fourth line, of the display screen 104 and the second group of sub-memory units 1022*b;*

Step 218: Starting from the next but one sub-memory unit to the sub-memory unit 1022_B, i.e., the sub-memory unit 1022_(B+2) or the sub-memory unit 1022_(B−2) (In this embodiment, the next but one sub-memory unit to the sub-memory unit 1022_B is chosen as the sub-memory unit 1022_(B+2) for brevity), in the second group of sub-memory units 1022*b*, sequentially store the pixel data of pixels being displayed on the fourth line of the display screen 104 into the sub-memory units 1022_(B+2), 1022_(B+4), 1022_(B+6), . . . , 1022_M, 1022_2, 1022_4, . . . , 1022_(B−2), 1022_B of the second group of sub-memory units 1022*b*, and after storing a pixel data of a pixel into the sub-memory unit 1022_B, go to the sub-memory unit 1022_(B+2) to repeatedly store the pixel data of pixels into the sub-memory units 1022_(B+2), 1022_(B+4), 1022_(B+6), . . . , 1022_M, 1022_2, 1022_4, . . . , 1022_(B−2), 1022_B until all the pixel data of pixels being displayed on the fourth line of the display screen 104 are stored into the sub-memory units 1022_(B+2), 1022_(B+4), 1022_(B+6), . . . , 1022_M, 1022_2, 1022_4, . . . , 1022_(B−2), 1022_B of the second group of sub-memory units 1022*b*.

For brevity, the above-mentioned lines are referred to the rows of the display screen 104. In other words, according to the present invention, the first group of sub-memory units 1022*a* are assigned to store the pixel data of pixels being displayed on the odd number rows of the display screen 104, and the second group of sub-memory units 1022*b* are assigned to store the pixel data of pixels being displayed on the even number rows of the display screen 104. It should be noted that, the above-mentioned lines can also be referred to the columns of the display screen 104. When the above-mentioned lines are referred to the columns of the display screen 104, the first group of sub-memory units 1022*a* are assigned to store the pixel data of pixels being displayed on the odd number columns of the display screen 104, and the second group of sub-memory units 1022*b* are assigned to store the pixel data of pixels being displayed on the even number columns of the display screen 104.

Furthermore, the host 105 repeats the above-mentioned steps 212-218 until the pixel data of all of the rows of the display screen 104 are stored into the plurality of sub-memory units 1022. According to the present invention, when the pixel data of all of the rows of the display screen 104 are stored into the plurality of sub-memory units 1022, the pixel data of the first pixel in the next row must not be stored into the same sub-memory unit as the sub-memory unit that the pixel data of the last pixel in the previous row being stored to. This is because the pixel data of pixels being displayed on the previous row are sequentially stored into the first group of sub-memory units 1022*a* and the pixel data of pixels being displayed on the next row next to the previous row are sequentially stored into the second group of sub-memory units 1022*b*, wherein the first group of sub-memory units 1022*a* is different from the second group of sub-memory units 1022*b* and the previous row is immediately adjacent to the next row.

In addition, when the pixel data of pixels being displayed on the current row, i.e., the second line, are stored into the sub-memory units of the second group of sub-memory units 1022*b* in Step 210, the host 105 goes to the next line, i.e., the third line, and goes to the next but one sub-memory unit, i.e., the sub-memory unit 1022_(A+2) to the current sub-memory unit of the first group of sub-memory units 1022*a* in order to sequentially store the pixel data of pixels being displayed on the third line of the display screen 104 into the sub-memory units 1022_1, 1022_3, 1022_5, . . . , 1022_(M−1) of the first group of sub-memory units 1022*a* (Step 214) Then, when the pixel data of pixels being displayed on the current row, i.e., the third line, are stored into the sub-memory units of the first group of sub-memory units 1022*a* in Step 214, the host 105 goes to the next line, i.e., the fourth line, and goes to the next but one sub-memory unit, i.e., the sub-memory unit 1022_(B+2) to the current sub-memory unit of the second group of sub-memory units 1022*b* in order to sequentially store the pixel data of pixels being displayed on the fourth line of the display screen 104 into the sub-memory units 1022_2, 1022_4, 1022_6, . . . , 1022_M of the second group of sub-memory units 1022*b* (Step 218) Accordingly, by repeating the step 212-218 to store all the pixel data of pixels of the display screen 104 into the plurality of sub-memory units 1022, the pixel data of the first pixel in the next column must not be stored into the same sub-memory unit as the sub-memory unit that the pixel data of the last pixel in the previous column being stored to.

Figure 3:
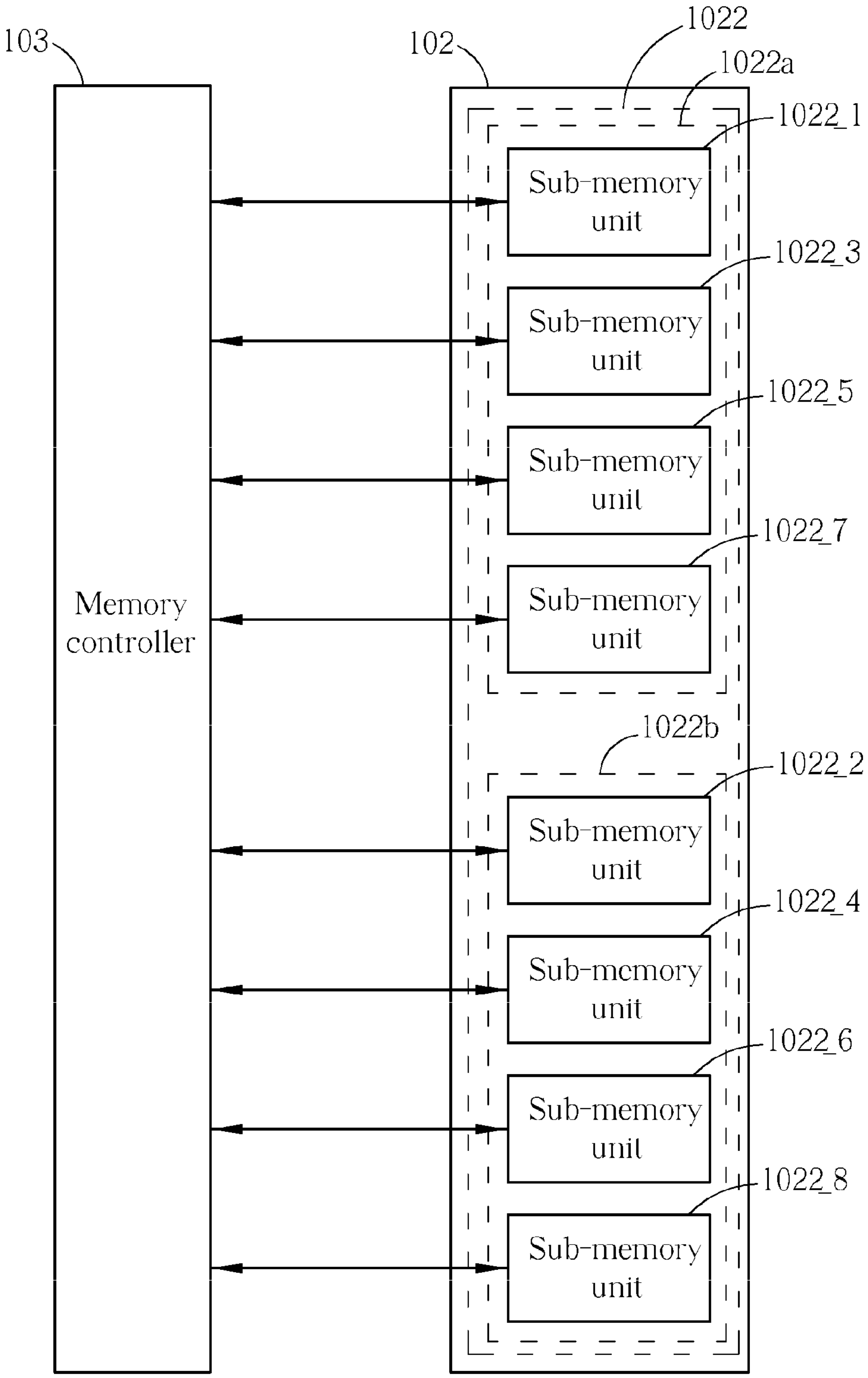
FIG. 3 is a diagram illustrating a memory device divided into eight sub-memory units according to an embodiment of the present invention.

To more clearly illustrate the features of the present method 200, an embodiment 300 is disclosed. In this embodiment 300, the memory device 102 has the original memory access rate of X, the target memory access rate Y is four times the original memory access rate of X (i.e., P=4), and the integer factor Q is two (i.e., Q=2), therefore the number M of the plurality of sub-memory units 1022 of the memory device 102 is eight (i.e., M=8) (Step 202). In other words, the memory device 102 is divided into eight sub-memory units 1022 in order to obtain four times the original memory access rate X as shown in FIG. 3. FIG. 3 is a diagram illustrating the memory controller 103 and the memory device 102 divided into eight sub-memory units 1022 according to the embodiment 300 of the present invention, wherein eight sub-memory units 1022 are labeled as 1022_1-1022_8. Furthermore, in this embodiment 300, the sub-memory units of 1022_1, 1022_3, 1022_5, 1022_7 (i.e., the sub-memory units that are labeled as odd numbers) are categorized as the first group of sub-memory units 1022*a*, and the sub-memory units of 1022_2, 1022_4, 1022_6, 1022_8 (i.e., the sub-memory units that are labeled as even numbers) are categorized as the second group of sub-memory units 1022*b* (Step 204).

In this embodiment, when the host needs to updates the pixel data of pixels being displayed on the display screen 104 into the memory device 102, the memory controller 103 (controlled by the host 105) can set the first sub-memory unit 1022_1 in the first group of sub-memory units 1022*a* as the current sub-memory unit in the first group of sub-memory units 1022*a*, and set the first row of the display screen 104 as the current row. Then, starting from the first sub-memory unit 1022_1, the memory controller 103 sequentially stores the pixel data of pixels being displayed on the first row of the display screen 104 into the sub-memory units 1022_1, 1022_3, 1022_5, 1022_7, of the first group of sub-memory units 1022*a* until all the pixel data of pixels being displayed on the first row of the display screen 104 are stored into the sub-memory units 1022_1, 1022_3, 1022_5, 1022_7(Step 206).

Then, when the pixel data of pixels being displayed on the first row of the display screen 104 are all sequentially stored into the sub-memory units 1022_1, 1022_3, 1022_5, 1022_7 of the first group of sub-memory units 1022*a*, the memory controller 103 goes to the next row of the display screen 104 and the second group of sub-memory units 1022*b* (Step 208). Then, starting from the second sub-memory unit 1022_4, the memory controller 103 sequentially stores the pixel data of pixels being displayed on the second row of the display screen 104 into the sub-memory units 1022_4, 1022_6, 1022_8, 1022_2, of the second group of sub-memory units 1022*b* (Step 210).

Then, when the pixel data of pixels being displayed on the second row of the display screen 104 are all sequentially stored into the sub-memory units 1022_2, 1022_4, 1022_6, 1022_8 of the second group of sub-memory units 1022*b*, the memory controller 103 goes to the next row, i.e., the third row, of the display screen 104 and the first group of sub-memory units 1022*a* (Step 212). Then, starting from the next but one sub-memory unit to the first sub-memory unit 1022_1, i.e., the third sub-memory unit 1022_5, the memory controller 103 sequentially stores the pixel data of pixels being displayed on the third row of the display screen 104 into the sub-memory units 1022_5, 1022_7, 1022_1, 1022_3, of the first group of sub-memory units 1022*a* until all the pixel data of pixels being displayed on the third row of the display screen 104 are stored into the sub-memory units 1022_1, 1022_3, 1022_5, 1022_7 of the first group of sub-memory units 1022*a* (Step 214).

Then, when the pixel data of pixels being displayed on the third row of the display screen 104 are all sequentially stored into the sub-memory units 1022_5, 1022_7, 1022_1, 1022_3 of the first group of sub-memory units 1022*a*, the memory controller 103 goes to the next row, i.e., the fourth row, of the display screen 104 and the second group of sub-memory units 1022*b*. Then, starting from the next but one sub-memory unit to the second sub-memory unit 1022_4, i.e., the fourth sub-memory unit 1022_8, the memory controller 103 sequentially stores the pixel data of pixels being displayed on the fourth row of the display screen 104 into the sub-memory units 1022_8, 1022_2, 1022_4, 1022_6, of the second group of sub-memory units 1022*b* until all the pixel data of pixels being displayed on the fourth row of the display screen 104 are stored into the sub-memory units 1022_8, 1022_2, 1022_4, 1022_6 of the second group of sub-memory units 1022*b* (Step 218).

Figure 4:
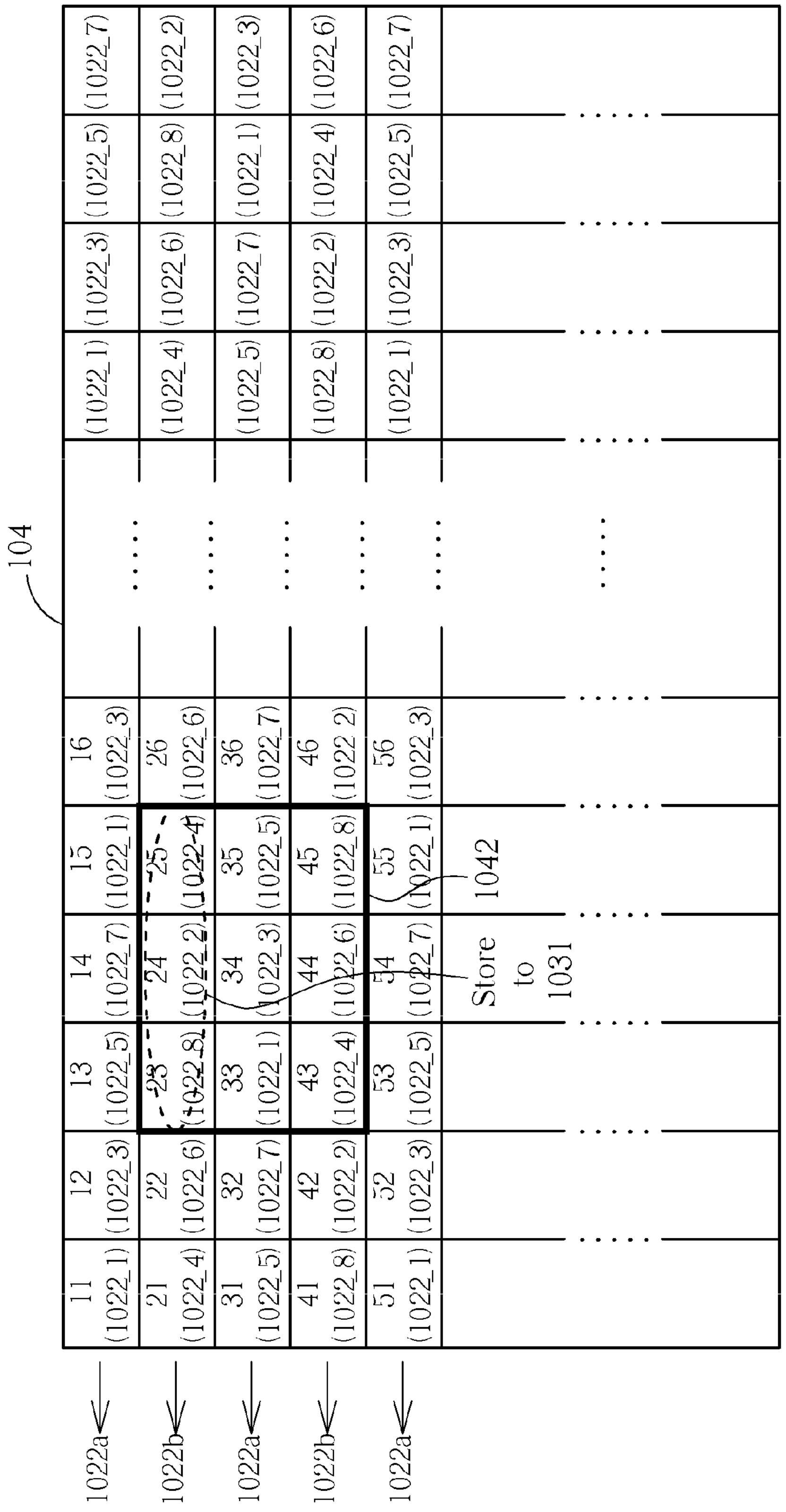
FIG. 4 is a diagram illustrating allocation of pixels of a display screen into the eight sub-memory units shown in FIG. 3 according to the embodiment of the present invention.

Please refer to FIG. 4. FIG. 4 is a diagram illustrating the allocation of the pixels of the display screen 104 into the eight sub-memory units 1022_1-1022_8 according to the embodiment 300 of the present invention. In the first row of the display screen 104, the pixel data of the first pixel 11 are stored into the first sub-memory unit 1022_1 of the first group of sub-memory units 1022*a*, the pixel data of the second pixel 12 are stored into the second sub-memory unit of 1022_3 of the first group of sub-memory units 1022*a*, the pixel data of the third pixel 13 are stored into the third sub-memory unit of 1022_5 of the first group of sub-memory units 1022*a*, the pixel data of the fourth pixel 14 are stored into the fourth sub-memory unit of 1022_7 of the first group of sub-memory units 1022*a*, and so on (step 206).

In the second row of the display screen 104, the pixel data of the first pixel 21 are stored into the second sub-memory unit of 1022_4 of the second group of sub-memory units 1022*b*, the pixel data of the second pixel 22 are stored into the third sub-memory unit of 1022_6 of the second group of sub-memory units 1022*b*, the pixel data of the third pixel 23 are stored into the fourth sub-memory unit of 1022_8 of the second group of sub-memory units 1022*b*, the pixel data of the fourth pixel 24 are stored into the first sub-memory unit of 1022_2 of the second group of sub-memory units 1022*b*, and so on (step 210).

In the third row of the display screen 104, the pixel data of the first pixel 31 are stored into the third sub-memory unit of 1022_5 of the first group of sub-memory units 1022*a*, the pixel data of the second pixel 32 are stored into the fourth sub-memory unit of 1022_7 of the first group of sub-memory units 1022*a*, the pixel data of the third pixel 33 are stored into the first sub-memory unit of 1022_1 of the first group of sub-memory units 1022*a*, the pixel data of the fourth pixel 34 are stored into the second sub-memory unit of 1022_3 of the first group of sub-memory units 1022*a*, and so on (step 214).

In the fourth row of the display screen 104, the pixel data of the first pixel 41 are stored into the fourth sub-memory unit of 1022_8 of the second group of sub-memory units 1022*b*, the pixel data of the second pixel 42 are stored into the first sub-memory unit of 1022_2 of the second group of sub-memory units 1022*b*, the pixel data of the third pixel 43 are stored into the second sub-memory unit of 1022_4 of the second group of sub-memory units 1022*b*, the pixel data of the fourth pixel 44 are stored into the third sub-memory unit of 1022_6 of the second group of sub-memory units 1022*b*, and so on (step 218).

Please refer to FIG. 4 again. It can be determined from FIG. 4 that, after the pixel data of the last pixel of the first row of the display screen 104 is stored into the fourth sub-memory unit of 1022_7, the pixel data of the first pixel of the next row (i.e., the second row) of the display screen 104 is stored into the second sub-memory unit 1022_4 of the second group of sub-memory units 1022*b*. After the pixel data of the last pixel of the second row of the display screen 104 is stored into the first sub-memory unit of 1022_2 of the second group of sub-memory units 1022*b*, the pixel data of the first pixel of the next row (i.e., the third row) of the display screen 104 is stored into the third sub-memory unit 1022_5 of the first group of sub-memory units 1022*a*. After the pixel data of the last pixel of the third row of the display screen 104 is stored into the first sub-memory unit of 1022_3 of the first group of sub-memory units 1022*a*, the pixel data of the first pixel of the next row (i.e., the fourth row) of the display screen 104 is stored into the fourth sub-memory unit 1022_8 of the second group of sub-memory units 1022*b*. Therefore, when a row ends up in one group of sub-memory units (e.g., the first group of sub-memory units 1022*a*), the next row is started at another group of sub-memory units (e.g., the second group of sub-memory units 1022*b*), and the pixel data of the first pixel of the next row is stored into the next but one sub-memory unit (e.g., the sub-memory unit of 1022_8) to the sub-memory unit being stored to last time (e.g., the sub-memory unit of 1022_4) in the group of sub-memory units (e.g., the second group of sub-memory units 1022*b*).

Therefore, when the pixel data of the pixels in the display screen 104 are written into the memory device 102, no sub-memory unit will be written to twice in four writing cycles, wherein one writing cycle is utilized for writing the pixel data of one pixel into one sub-memory unit. In other words, no matter whether the pixel data of the pixels in the display screen 104 are written into the memory device 102 from the direction of left to right, right to left, top to bottom, bottom to top, horizontally, or vertically, no sub-memory unit in the memory device 102 will be written to twice in four writing cycles. Therefore the writing speed (i.e., the target memory access rate Y) of the pixel data of the pixels in the display screen 104 being written into the memory device 102 can be maintained at exactly four times the original memory access rate X.

Furthermore, when an active window 1042 is set for the display screen 104 and the active window 1042 includes a plurality of selected pixels (e.g., nine pixels as shown in FIG. 4), then the pixel data of the nine pixels being displayed on the active window 1042 are controlled to be written into the memory device 102 sequentially. If the pixel data of the first pixel (i.e., the pixel 23) is being stored into the memory device 102 after pixel data of the last pixel (i.e., the pixel 45) is stored into the memory device 102, the pixel data of the pixel 23 should not be written into the sub-memory unit of 1022_8. This is because pixel data of the pixel 45 has been stored into the sub-memory unit of 1022_8 in the last cycle, and if the pixel data of the pixel 23 is written into the sub-memory unit of 1022_8 again, the writing speed of the pixel data of the pixels in the active window 1042 will become the original memory access rate X rather than four times the original memory access rate X.

Therefore, if the above-mentioned situation occurs, pixel data of three leading pixels (e.g., the pixels 23, 24, 25) in the active window 1042 are controlled to be stored into a specific storage device other than the memory device 102 (i.e., the plurality of sub-memory units of 1022_8, 1022_2, and 1022_4) which were originally assigned for the pixels 23, 24, 25 respectively. Please note that, when the pixel data of the pixels 23, 24, 25 in the active window 1042 are stored into the specific storage device, the addresses corresponding to the pixels 23, 24, 25 are also controlled to be stored into the specific storage device. When the processor (i.e., the host 105) in the mobile apparatus needs to access the pixel data of the pixels 23, 24, 25, the processor is controlled to access the pixel data of the pixels 23, 24, 25 from the specific storage device. Please note that the number of leading pixels in the active window 1042 that are controlled to be stored into the specific storage device corresponds to the target memory access rate Y. In this embodiment, when the target memory access rate Y is four times the original memory access rate X, the number of leading pixels in the active window 1042 that are stored into the specific storage device is three. In other words, the number of leading pixels in the active window 1042 that are controlled to be stored into the specific storage device is not larger than the multiple factor of the target memory access rate Y over the original memory access rate X.

In addition, the pixel data of the pixels 23, 24, 25 that are stored into the specific storage device should be restored into the memory device 102 according to the addresses of the pixels 23, 24, 25 stored in the specific storage device when the active window 1042 is adjusted. In other words, when the active window 1042 is adjusted, the pixel data of the pixels 23, 24, 25 that are stored into the specific storage device are controlled to be restored into the sub-memory units of 1022_8, 1022_2, and 1022_4, which were originally assigned for the pixels 23, 24, 25 respectively. Accordingly, since no sub-memory unit in the memory device 102 will be written to twice in four writing cycles in any size of active window 1042, the writing speed (i.e., the target memory access rate Y) of the pixel data of the pixels in the active window 1042 is guaranteed to be four times the original memory access rate X. The specific storage device may also include a plurality of flip-flops for storing the pixel data and the addresses of the plurality of leading pixels in the active window 1042, but this is not meant to be a limitation of the present invention.

Figure 5:
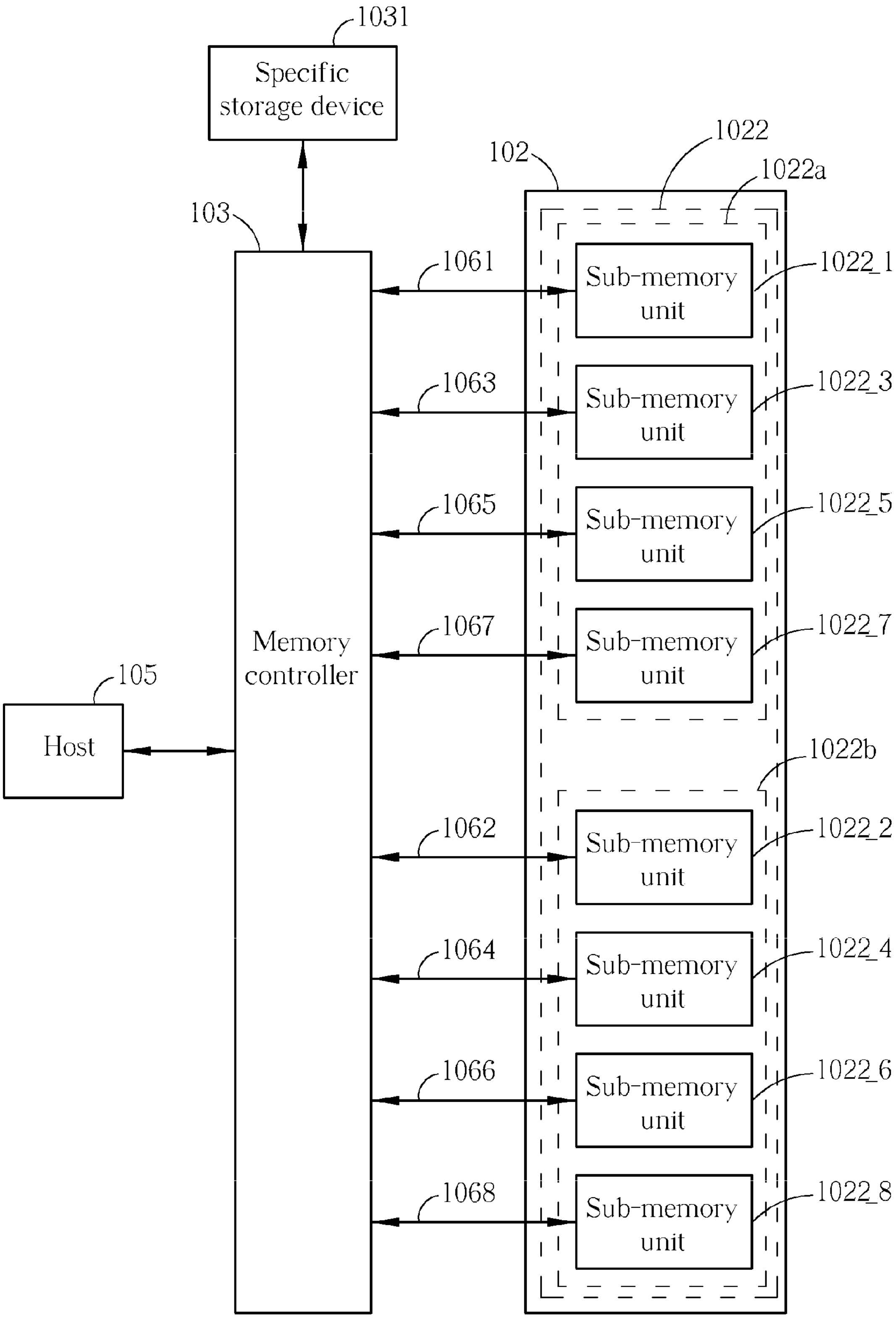
FIG. 5 is a detailed diagram illustrating the memory controlling system of a memory device in a mobile apparatus according to an embodiment of the present invention.

Please refer to FIG. 5. FIG. 5 is a detailed diagram illustrating the memory controlling system 100 of the memory device 102 in the mobile apparatus according to an embodiment of the present invention. The memory device 102 comprises the plurality of sub-memory units 1022_1-1022_8. The memory controlling system 100 further comprises a first connecting circuit 1061, a second connecting circuit 1062, a third connecting circuit 1063, a fourth connecting circuit 1064, a fifth connecting circuit 1065, a sixth connecting circuit 1066, a seventh connecting circuit 1067, a eighth connecting circuit 1068. The specific storage device 1031 is coupled to the memory controller 103. The first connecting circuit 1061 is coupled between the memory controller 103 and the first sub-memory unit 1022_1 in the first group of sub-memory units 1022*a*. The third connecting circuit 1063 is coupled between the memory controller 103 and the second sub-memory unit 1022_3 in the first group of sub-memory units 1022*a*. The fifth connecting circuit 1065 is coupled between the memory controller 103 and the third sub-memory unit 1022_5 in the first group of sub-memory units 1022*a*. The seventh connecting circuit 1067 is coupled between the memory controller 103 and the fourth sub-memory unit 1022_7 in the first group of sub-memory units 1022*a*.

In addition, the second connecting circuit 1062 is coupled between the memory controller 103 and the first sub-memory unit 1022_2 in the second group of sub-memory units 1022*b*. The fourth connecting circuit 1064 is coupled between the memory controller 103 and the second sub-memory unit 1022_4 in the second group of sub-memory units 1022*b*. The sixth connecting circuit 1066 is coupled between the memory controller 103 and the third sub-memory unit 1022_6 in the second group of sub-memory units 1022*b*. The eighth connecting circuit 1068 is coupled between the memory controller 103 and the fourth sub-memory unit 1022_8 in the second group of sub-memory units 1022*b*.

Please refer to FIG. 2 in conjunction with FIG. 4. When the memory controller 103 performs the steps 202-218 to write the pixel data being displayed on the display screen 104 into the memory device 102, the allocation of the pixels in the display screen 104 into the memory device 102 is obtained accordingly to the above-mentioned process as shown in FIG. 4. Therefore, no sub-memory unit is written to twice in four writing cycles no matter whether the pixel data of the pixels in the display screen 104 are written into the memory device 102 in a direction from left to right, right to left, top to bottom, bottom to top, horizontally, or vertically.

In addition, the memory controller 103 is also coupled to the specific storage device 1031 via another connecting circuit. According to the above description, when the active window 1042 is set for the display screen 104, the memory controller 103 stores the pixel data and the corresponding addresses of the pixels (e.g., the pixels 23, 24, 25) in the active window 1042 into the specific storage device 1031 via the another connecting circuit. In addition, when the active window 1042 is adjusted, the memory controller 103 restores the pixel data of the pixels (e.g., the pixels 23, 24, 25) that are stored into the specific storage device 1031 into the sub-memory units (e.g., the sub-memory units of 1022_8, 1022_2, and 1022_4) from the specific storage device 1031 via the another connecting circuit. Therefore, no sub-memory unit in the memory device 102 will be written to twice in four writing cycles in any size of active window 1042, and the writing speed (i.e., the target memory access rate Y) of the pixel data of the pixels in the active window 1042 is guaranteed to be four times the original memory access rate X. It should be noted that the above-mentioned memory controlling system 100 is just an exemplary embodiment, and is not meant to be a limitation of the present invention.

Briefly, the present invention divides the memory device 102 into M sub-memory units 1022 according to the target memory access rate Y, wherein the target memory access rate Y is a multiple of the original memory access rate X of the memory device 102 by an integer factor P, and the number M is a multiple of the integer factor P by another integer factor Q which is not less than two. The present invention further categorizes the M sub-memory units 1022 into the first group of sub-memory units 1022*a* and the second group of sub-memory units 1022*b*, wherein the first group of sub-memory units 1022*a* is different from the second group of sub-memory units 1022*b*. The present invention further writes the pixel data being displayed on the odd row and the even row of the display screen 104 into the first group of sub-memory units 1022*a* and the second group of sub-memory units 1022*b*, respectively. If the active window 1042 is set for the display screen 104, the present invention further stores the pixel data and the corresponding addresses of the leading pixels in the active window 1042 into the specific storage device 1031 other than the memory device 102. Accordingly, the writing rate of the pixel data from the display screen 104 into the memory device 102 is guaranteed as the target memory access rate Y.

Those skilled in the art will readily observe that numerous modifications and alterations of the device and method may be made while retaining the teachings of the invention.

What is claimed is:

1. A method for controlling a memory device, comprising:

categorizing a plurality of sub-memory units of the memory device into a first group of sub-memory units and a second group of sub-memory units, wherein the first group of sub-memory units is different from the second group of sub-memory units;

starting from a first selected sub-memory unit in the first group of sub-memory units, sequentially storing pixel data of a plurality of pixels being displayed on a first line of a display screen into the sub-memory units of the first group of sub-memory units until all the pixel data of the plurality of pixels being displayed on the first line are stored into the sub-memory units of the first group of sub-memory units;

starting from a second selected sub-memory unit in the second group of sub-memory units, sequentially storing the pixel data of a plurality of pixels being displayed on a second line next to the first line of the display screen into the sub-memory units of the second group of sub-memory units until all the pixel data of the plurality of pixels being displayed on the second line are stored into the sub-memory units of the second group of sub-memory units;

starting from a next but one sub-memory unit to the first selected sub-memory unit in the first group of sub-memory units, sequentially storing the pixel data of a plurality of pixels being displayed on a third line next to the second line of the display screen into the sub-memory units of the first group of sub-memory units until all the pixel data of the plurality of pixels being displayed on the third line are stored into the sub-memory units of the first group of sub-memory units;

setting an active window for the display screen, wherein the active window includes a plurality of selected pixels; and after pixel data of a last pixel in the active window is stored into one of the plurality of sub-memory units, storing pixel data of a plurality of leading pixels in the active window into a specific storage device other than the plurality of sub-memory units.

2. The method of claim 1, further comprising:

starting from the next but one sub-memory unit to the second selected sub-memory unit in the second group of sub-memory units, sequentially storing the pixel data of a plurality of pixels being displayed on the fourth line next to the third line of the display screen into the sub-memory units of the second group of sub-memory units until all the pixel data of the plurality of pixels being displayed on the fourth line are stored into the sub-memory units of the second group of sub-memory units.

3. The method of claim 1, wherein the first and third lines are two odd number rows of the display screen, and the second and fourth lines are two even number rows of the display screen.

4. The method of claim 1, wherein the first and third lines are two odd number columns of the display screen, and the second and fourth lines are two even number columns of the display screen.

5. The method of claim 1, wherein the memory device has an original memory access rate before being divided into the plurality of sub-memory units, the memory device has a target memory access rate being a multiple of the original memory access rate of the memory device by an integer factor after being divided into the plurality of sub-memory units, and a number of the plurality of sub-memory units of the memory device is a multiple of the integer factor by another integer factor which is not less than two.

6. The method of claim 1, wherein the memory device has an original memory access rate before being divided into the plurality of sub-memory units, the memory device has a target memory access rate being a multiple of the original memory access of the memory device by an integer factor after being divided into the plurality of sub-memory units, and a number of the plurality of leading pixels is smaller than the integer factor.

7. The method of claim 1, wherein the step of storing the pixel data of the plurality of leading pixels in the active window into the specific storage device other than the plurality of sub-memory units further comprises:

storing addresses corresponding to the plurality of leading pixels into the specific storage device.

8. The method of claim 7, wherein the specific storage device includes a plurality of flip-flops for storing the pixel data and the addresses of the plurality of leading pixels.

9. The method of claim 7, further comprising:

when the active window is adjusted, storing the pixel data of the plurality of leading pixels stored in the specific storage device into the memory device according to the addresses of the plurality of leading pixels stored in the specific storage device.

10. An apparatus for controlling a memory device, the memory device comprises a plurality of sub-memory units, the apparatus comprising:

a plurality of first connecting circuits, coupled to a first group of sub-memory units of the memory device;

a plurality of second connecting circuits, coupled to a second group of sub-memory units of the memory device, wherein the plurality of sub-memory units are categorized into the first group of sub-memory units and the second group of sub-memory units, and the first group of sub-memory units is different from the second group of sub-memory units; and a memory controller, coupled to the first connecting circuit and the second connecting circuit, for, starting from a first selected sub-memory unit in the first group of sub-memory units, sequentially storing pixel data of a plurality of pixels being displayed on a first line of a display screen into the sub-memory units of the first group of sub-memory units via the plurality of first connecting circuits until all the pixel data of the plurality of pixels being displayed on the first line are stored into the sub-memory units of the first group of sub-memory units, for, starting from a second selected sub-memory unit in the second group of sub-memory units, sequentially storing the pixel data of a plurality of pixels being displayed on a second line next to the first line of the display screen into the sub-memory units of the second group of sub-memory units via the plurality of second connecting circuits until all the pixel data of the plurality of pixels being displayed on the second line are stored into the sub-memory units of the second group of sub-memory units, and for, starting from a next but one sub-memory unit to the first selected sub-memory unit in the first group of sub-memory units, sequentially storing the pixel data of a plurality of pixels being displayed on a third line next to the second line of the display screen into the sub-memory units of the first group of sub-memory units via the plurality of first connecting circuits until all the pixel data of the plurality of pixels being displayed on the third line are stored into the sub-memory units of the first group of sub-memory units;

wherein when an active window is set for the display screen, and the active window includes a plurality of selected pixels, the memory controller further stores pixel data of a plurality of leading pixels in the active window into a specific storage device other than the plurality of sub-memory units after pixel data of a last pixel in the active window is stored into one of the plurality of sub-memory units.

11. The apparatus of claim 10, wherein the memory controller further, starting from the next but one sub-memory unit to the second selected sub-memory unit in the second group of sub-memory units, sequentially stores the pixel data of a plurality of pixels being displayed on the fourth line next to the third line of the display screen into the sub-memory units of the second group of sub-memory units via the plurality of second connecting circuits until all the pixel data of the plurality of pixels being displayed on the fourth line are stored into the sub-memory units of the second group of sub-memory units.

12. The apparatus of claim 10, wherein the first and third lines are two odd number rows of the display screen, and the second and fourth lines are two even number rows of the display screen.

13. The apparatus of claim 10, wherein the first and third lines are two odd number columns of the display screen, and the second and fourth lines are two even number columns of the display screen.

14. The apparatus of claim 10, wherein the memory device has an original memory access rate before being divided into the plurality of sub-memory units, the memory device has a target memory access rate being a multiple of the original memory access rate of the memory device by an integer factor after being divided into the plurality of sub-memory units, and a number of the plurality of sub-memory units of the memory device is a multiple of the integer factor by another integer factor which is not less than two.

15. The apparatus of claim 10, wherein the memory device has an original memory access rate before being divided into the plurality of sub-memory units, the memory device has a target memory access rate being a multiple of the original memory access of the memory device by an integer factor after being divided into the plurality of sub-memory units, and a number of the plurality of leading pixels is smaller than the integer factor.

16. The apparatus of claim 10, wherein the memory controller further stores addresses corresponding to the plurality of leading pixels into the specific storage device.

17. The apparatus of claim 16, wherein the specific storage device includes a plurality of flip-flops for storing the pixel data and the addresses of the plurality of leading pixels.

18. The apparatus of claim 16, wherein when the active window is adjusted, the memory controller further stores the pixel data of the plurality of leading pixels stored in the specific storage device into the memory device according to the addresses of the plurality of leading pixels stored in the specific storage device.

* * * * *